United States Patent Office.

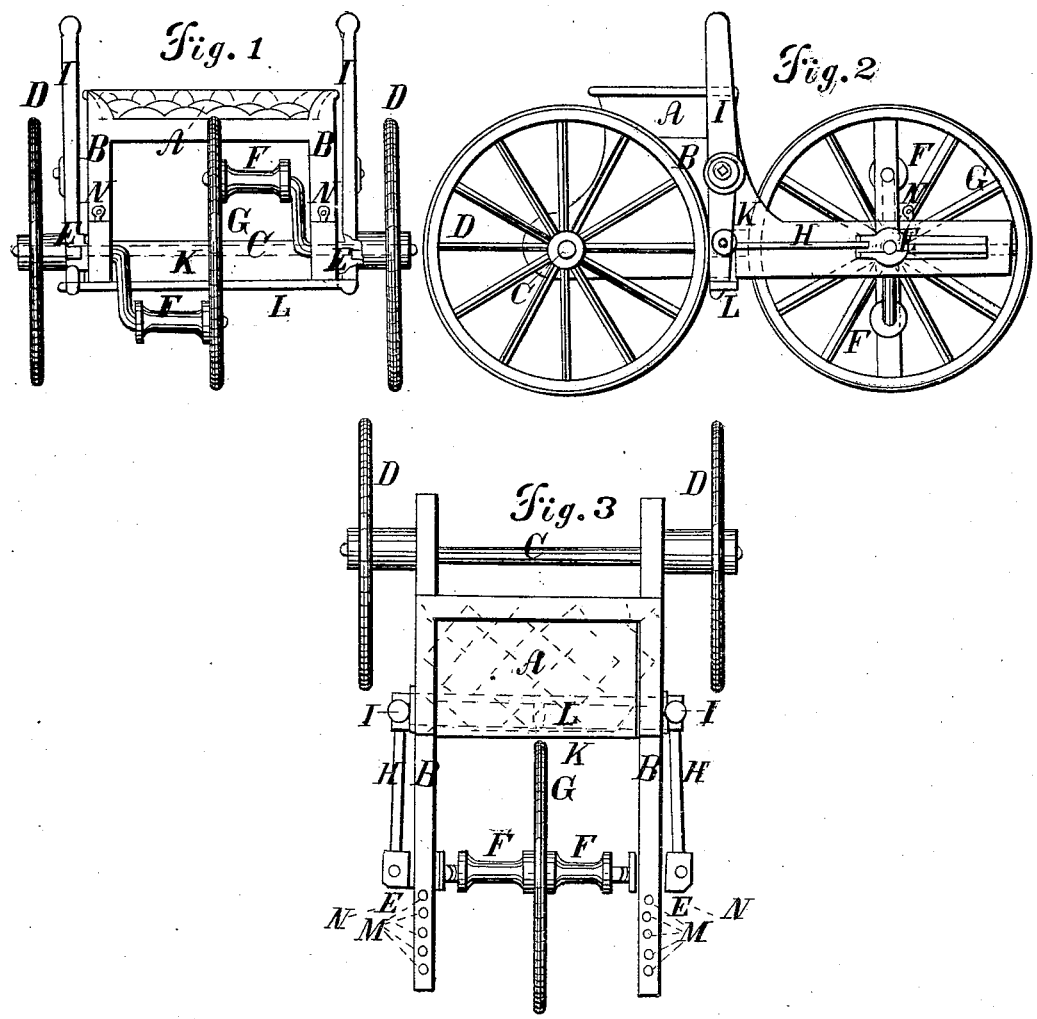

WILLIAM QUINN, OF PHILADELPHIA, PENNSYLVANIA.

Letters Patent No. 102,321, dated April 26, 1870; antedated April 19, 1870.

IMPROVEMENT IN VELOCIPEDES.

The Schedule referred to in these Letters Patent and making part of the same.

*To all whom it may concern:*

Be it known that I, WILLIAM QUINN, of the city and county of Philadelphia and State of Pennsylvania, have invented a new and useful Mode of Constructing Velocipedes for Physical Exercise; and I do hereby declare the following to be a full, clear, and exact description thereof, reference being had to the accompanying drawings and letters of reference marked thereon.

The nature of my invention consists in so applying a steering apparatus of simple construction to the cranked axle of the front or propelling-wheel as to enable me to produce a strong, safe, and convenient vehicle at a less cost than those of other constructions.

Figure 1 shows a front elevation.
Figure 2 shows a side elevation.
Figure 3 shows a plan.

The same letters of reference apply to the same parts in the several figures.

The seat A of this vehicle is supported upon two side pieces B B, which rest at the rear on the back axle C, having wheels D D turning freely on it.

The front ends of the side pieces B B are slotted, and in the slots are boxes E E, capable of sliding lengthwise in the slots, and fitting upon journals on the ends of the double-cranked axle F F of the propelling-wheel G The boxes E E are connected by means of links H H to the levers I I, and by means of the levers I I the front axle can be held parallel to the rear axle, when, upon rotating the front wheel by means of the feet of the rider upon the cranks F F, the vehicle will progress in right line, and upon moving the levers so as to place the axis of the front wheel obliquely to the axis of the back wheels the vehicle will move in a curve, the center of which curve is on the side of the vehicle on which the axles are nearest to each other. When both ends of the front axle are brought toward the back axle, the wheel G is brought into contact with the brake K, formed under the front edge of the seat, and the progress is arrested.

In order to facilitate the steering of this velocipede, I sometimes introduce a beam, L, having a fulcrum in its center, and connected with the levers I I, so that the moving of one lever operates the other in an opposite direction.

The fulcrum of the beam L is capable of sliding enough to let the wheel G be drawn into contact with the brake-block under the seat A.

To prevent the boxes E E from moving too far from the seat to be reached by the feet of the rider, I bore a series of holes, M M, in the side pieces B B, into which I insert pins N N, and thus effect an easy adjustment of the velocipede to the size of the rider.

What I claim as my invention, and desire to secure as such by Letters Patent, is—

1. The combination of the cranked axle with the sliding boxes, operated by the links and levers, as described and shown.

2. The mode of restricting the motion of the boxes in the slots by means of the pins and holes, for the purpose and with the effect described.

3. The mode of operating the propelling-wheel against the block, to act as a brake, as set forth and described.

WM. QUINN.

Witnesses:
WM. REED,
WM. P. HIBBARD.